Aug. 22, 1961 E. J. LAWTON 2,997,418
COLD WELDING OF ORGANOPOLYSILOXANES
Filed Oct. 18, 1956
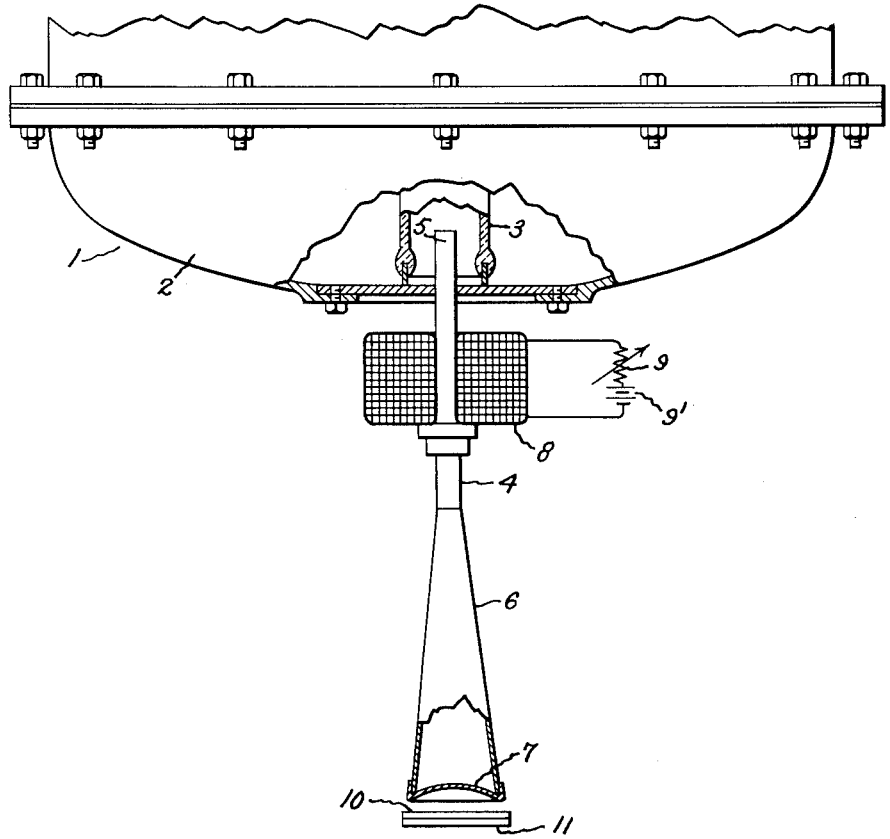
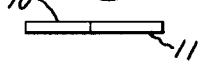
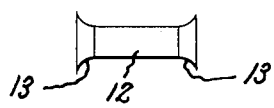
Inventor:
Elliott J. Lawton,
by Paul A. Frank
His Attorney.

United States Patent Office 2,997,418
Patented Aug. 22, 1961

2,997,418
COLD WELDING OF ORGANOPOLYSILOXANES
Elliott J. Lawton, Schenectady, N.Y., assignor to General Electric Company, a corporation of New York
Filed Oct. 18, 1956, Ser. No. 616,869
21 Claims. (Cl. 154—126)

This invention relates to a process of welding into an integral piece distinct and separate sections of organopolysiloxane gums or rubbers which comprises placing separate sections of organopolysiloxanes in intimate contact with each other and treating the contacted sections with high energy radiation until welding is effected.

The features of this invention may best be understood by reference to the following description taken in connection with the accompanying drawing, in which:

FIG. 1 is a partially sectionalized, simplified view of a high voltage electron accelerating apparatus useful in the practice of the invention;

FIG. 2 is a view of two sections of organopolysiloxanes capable of being welded according to this invention; and FIG. 3 is a view of a flanged silicone tube produced according to this invention and useful for vascular grafts.

Heretofore, the vulcanization or curing of organopolysiloxanes to the solid elastic state has been effected by curing agents, such as benzoyl peroxide, tertiary butyl perbenzoate, etc. in combination with the application of heat. Although the products so produced are extremely useful commercially, the use of such curing agents is accompanied by the disadvantage that after the product is converted to the solid, elastic, substantially infusible and insoluble state, the presence of chemical residues of the aforesaid curing agents tends to affect deleteriously some of the properties of the cured product, such as heat-aging properties, the electrical properties, etc.

In patent application Serial No. 291,542, Lewis and Lawton, filed June 3, 1952, now U.S. Patent 2,763,609, and assigned to the same assignee as the present application there is disclosed and claimed a method of curing organopolysiloxanes without using chemical curing agents and heat which method comprises converting organopolysiloxanes to a solid elastic state with high energy radiation.

In preparing articles of manufacture from organopolysiloxanes, it is often desirable to weld separate sections of organopolysiloxanes in order to make a composite structure thereof; for example, in irradiation, it is simpler and more economical to irradiate within sections of polymer than to irradiate a bulky preformed article.

I have now discovered a process of welding distinct and separate sections of organopolysiloxane gums and rubbers which comprises placing separate sections of organopolysiloxanes in intimate contact with each other, and treating the contacted sections with high energy, ionizing radiation until the sections are welded. In addition to being able to weld an uncured organopolysiloxane gum (also called "gum") to another uncured gum, I have unexpectedly found that even gums which have already been partially cured can be welded to other sections comprising uncured gums or cured gums. Thus, I have been able to weld uncured gum to uncured gum, uncured gum to partially cured gum, uncured gum to well-cured gum (silicone rubber), partially cured gum to partially cured gum, partially cured gum to well-cured rubber, and well-cured rubber to well-cured rubber. Furthermore, I can weld sections of uncured gum or cured gum or rubber, each containing the same or different fillers. The fact that cured rubbers can be welded by this process indicates that this process is not a mere sticking together of "putty-like" material but rather depends on an actual welding to produce a finished product which has substantially the same properties such as tensile strength, percent elongation, etc. as if the material had been cured in one piece. This welding effect with organopolysiloxanes is quite unexpected since I have found that not all polymers capable of being cured with high energy, ionizing radiation can be welded with such radiation. For example, polyethylene, nylon, Mylar, etc. which can be cross-linked by high energy radiation, cannot be welded with even large doses of high energy, ionizing radiation. The ability to cold weld is further unexpected since polymer welding is usually carried out at elevated temperatures.

Besides the unexpected effect of being able to weld cured gums, it is very desirable to work with a partially cured gum in order to be able to handle and shape the material more effectively. This is particularly true in the case of carbon black filled gum which is "putty-like" in character and cannot be readily handled, especially in thin sheet form. However, after partially curing this material to the desired degree, it can be handled even in thin sheets and lends itself to this method of welding.

The organopolysiloxanes employed in this invention are organopolysiloxanes cured or curable to the solid elastic state. The curable organopolysiloxane or silicone compositions which may be highly viscous masses, or gummy elastic solids, depending on the state of condensation, the condensing agent employed, the starting organopolysiloxane used to make the curable organopolysiloxanes, etc. Although curable organopolysiloxanes with which the present invention is concerned are well known, for purposes of showing persons skilled in the art the various organopolysiloxanes which may be employed in the practice of the present invention, attention is directed to the curable organopolysiloxanes disclosed and claimed in Agens Patent 2,448,756; Sprung et al. Patent 2,448,556; Sprung Patent 2,484,595; Krieble et al. Patent 2,457,668; Hyde Patent 2,490,357; Marsden Patent 2,521,528; and Warrick Patent 2,541,137.

It will, of course, be understood by those skilled in the art that other curable organopolysiloxanes containing the same or different silicon-bonded organic substituents (alkyl, e.g. methyl, ethyl, propyl, butyl, octyl, etc.; alkenyl, e.g. vinyl, allyl, etc., cycloalkenyl, e.g. cyclohexenyl, etc. aryl e.g. phenyl, tolyl, xylyl, naphthyl, etc.; aralkyl, e.g. benzyl, phenylethyl, etc.; halogenated aryl, e.g. chlorophenyl, dibromophenyl, etc.; cycloalkyl e.g. cyclohexyl, etc.; alkinyl e.g. ethinyl, etc.; both methyl and phenyl, etc.; radicals) connected to silicon atoms by carbon-silicon linkages, may be employed without departing from the scope of the invention.

The particular curable organopolysiloxane used is not critical and may be any one of those described in the foregoing patents and is generally obtained by condensing a liquid organopolysiloxane containing an average of from about 1.9 to 2.1 preferably from about 1.98 to about 2.01, silicon-bonded organic groups per silicon atom. The usual condensing agents which may be employed and which are well known in the art may include, for instance, acid condensing agents e.g. ferric chloride hexahydrate, phenyl phosphoryl chloride, and the like; alkaline condensing agents e.g. quaternary phosphonium hydroxides and alkoxides, solid quaternary ammonium hydroxides, potassium hydroxide, cesium hydroxide, etc. These curable organopolysiloxanes generally comprise polymeric diorganosiloxanes which may contain, for example, from 0 to 2 mol percent copolymerized monoorganosiloxane, for example, copolymerized monomethylsiloxane. Generally, I prefer to use as the starting organopolysiloxane from which the curable organopolysiloxanes are prepared, one which contains about 1.98 to 2.01, inclusive, organic groups, for example, methyl groups per silicon atom where more than about 90% of the silicon atoms in the polysiloxane contain 2 silicon-bonded dialkyl groups.

The starting organopolysiloxanes used to make the curable organopolysiloxanes by condensation thereof preferably comprise organic substituents consisting essentially of monovalent organic radicals attached to silicon through carbon-silicon linkages and in which the siloxane units consist of units of the structural formula $R_2SiO$ where R is preferably a radical of the group consisting of methyl and phenyl radicals. At least 50% of the total number of R groups are preferably methyl radicals. The polysiloxane may be one in which all of the siloxane units are $(CH_3)_2SiO$ or the siloxane may be a copolymer of dimethylsiloxane and a minor amount (e.g., from 1 to 20 mol percent) of any of the following units alone or in combination therewith: $C_6H_5(CH_3)SiO$ and $(C_6H_5)_2SiO$.

The cured organopolysiloxanes employed in this invention are prepared from the above described curable organopolysiloxanes.

These organopolysiloxanes can be compounded with 0 to 200 parts by weight, but preferably 30 to 100 parts of various finely divided fillers per 100 parts of organopolysiloxanes on ordinary rubber compounding rolls. However, the amount of filler that can be compounded for optimum properties depends on the particular filler and the particle size of the filler. In general, a larger amount of coarse filler can be compounded with the gum than can a fine filler. Examples of solid, inert fillers comprise silica, silica aerogel, fumed silica, titanium dioxide, calcium silicate, ferric oxide, chromic oxide, cadmium sulfide, asbestos, glass fibers, alumina, calcium carbonate, carbon black, lithopone, talc, etc. In addition to the above silicas, hydrophobic silicas can also be used. Examples of those silicas which have been rendered hydrophobic by chemical treatment are the alcohol surface-esterified type described in U.S. Patent 2,657,149, Iler; silicas which have been treated with various alkyl chlorosilanes in the manner of Patents 2,510,661, 2,563,555, both granted to Safford and assigned to the same assignee as the present invention, 2,584,085, Stross; those silicas treated in the manner of Bueche et al., application Serial No. 531,829, filed August 31, 1955, now abandoned, and assigned to the same assignee as the present application. In addition, other modifying agents, such as dyes, pigments, stabilizers, plasticizers, antioxidants, etc. can also be used without departing from the scope of the invention.

In the drawing, there is shown high voltage accelerating apparatus 1 capable of producing a beam of high energy electrons for welding organopolysiloxanes in accordance with the invention. High voltage accelerating apparatus 1 may be of the type disclosed in Patent 2,144,518, Westendorp, assigned to the same assignee as the present application. In general, this apparatus comprises a resonant system having an open magnetic circuit inductance coil (not shown) which is positioned within a tank 2 and energized by a source of alternating voltage to generate a high voltage across its extremities. At the upper end (not shown) of a sealed-off, evacuated, tubular envelope 3 is located a source of electrons which is maintained at the potential of the upper extremity of the inductance coil, whereby a pulse of electrons is accelerated down envelope 3 once during each cycle of the energizing voltage when the upper extremity of the inductance coil is at a negative potential with respect to the lower end. Further details of the construction and operation of high voltage accelerating apparatus 1 may be found in the aforementioned Westendorp patent and in "Electronics," vol. 17, pp. 128–133 (December 1944).

To permit utilization of the high energy electrons accelerated down envelope 3, there is provided an elongated metal tube 4, the upper portion 5 of which is hermetically sealed to tank 2, as illustrated, by any convenient means, such as silver solder. The lower portion 6 of tube 4 is conical in cross section to allow an increased angular spread of the electron beam. The emergence of high energy electrons from tube 4 is facilitated by an end-window 7 which may be hermetically sealed to tube 4 by means of silver solder. End-window 7 should be thin enough to permit electrons of desired energy to pass therethrough but thick enough to withstand the force of atmospheric pressure. Stainless steel of about 0.002 inch thickness has been found satisfactory for use with electron energies above 230,000 electron volts or greater. Beryllium and other materials of low stopping power may also be employed effectively. By forming end-window 7 in arcuate shape as shown, greater strength for resisting the force of atmospheric pressure may be obtained for a given window thickness. Desired focussing of the accelerated electrons may be secured by a magnetic-field generating winding 8 energized by a source of direct current 9' through a variable resistor 9.

In practicing this invention, two separate and distinct sections of organopolysiloxanes are welded by placing the sections in intimate contact with each other. Two sheets, 10 and 11, are placed in intimate contact with each other as shown in FIG. 1. Alternatively, sheets 10 and 11 can be placed side by side in intimate contact with each other as shown in FIG. 2. These are supported in the path of electrons emerging from end-window 7 as illustrated. The high energy electrons penetrate the contacted materials to a depth dependent on the energy of the electrons and weld the individual pieces together. Of course, the sheets can be in the form of joined strip materials which are passed continuously under end-window 7 at a velocity selected to give the desired radiation dosage. In addition to welding sheet materials, sections of various shapes, such as bottles, cups, tubing, filaments, pipes, etc. can be welded according to this invention. Uniform treatment of polymeric materials having appreciable thickness can be assured by irradiating them first from one side and then from the other, or in some cases, from both sides simultaneously. In certain instances, it may be desirable to irradiate the polymeric materials in an atmosphere of nitrogen, argon, helium, krypton or xenon, etc., to prevent any damaging effect that may be caused by corona which may be present.

Irradiation can be carried out below room, at room, or at elevated temperatures.

The most commonly employed units for measuring high energy radiation are (1) Roentgen units and (2) Roentgen equivalent physical units. Roentgen units are more commonly used to measure gamma and X-rays and are usually defined as the amount of radiation that produces one electrostatic unit of charge per milliliter of dry air under standard conditions. The Roentgen equivalent physical unit (the "rep.") is a convenient unit which usually describes the radiation dose from other than gamma or X-rays, and is the measure of the ionization in the absorber of tissue. The ionization produced by primary radiation is expressed as one rep. when the energy lost in tissue is equivalent to the energy lost by the absorption of one Roentgen of gamma or X-rays in air. Further definitions of "Roentgen" and "rep." can be found on p. 256 of "The Science and Engineering of Nuclear Power," edited by Clark Goodman (1947), and on p. 436 of "Nuclear Radiation Physics," by Lapp and Andrews (1948). For convenience, the term "Roentgen equivalent physical" or "rep." will be used in the specification and appended claims.

It will be readily realized that other forms of electron accelerating apparatus may be employed instead of high voltage apparatus 1. For example, linear accelerators of the type described by J. C. Slater in the "Reviews of Modern Physics," vol. 20, No. 3, pp. 473–518 (July 1948), may be utilized. To decrease wasteful energy absorption between the point of exit of electrons from the accelerating apparatus and the polymeric materials, a vacuum chamber having thin entrance and exit windows may be inserted in the space.

In general, the energy of the irradiation advantageously employed in the practice of my invention may range from about 50,000 to 20 million electron volts or higher depending upon materials. Although high energy electron irradiation is preferred since it produces a large amount of easily controllable high energy, ionizing radiation within a short period of time without rendering the product radioactive, many other sources of high energy, ionizing radiation can also be used in my invention. Examples of such ionizing radiation sources are gamma rays, such as can be obtained from $Co^{60}$, "burnt" uranium slugs, fission by-products, such as waste solution, separated isotopes, such as $Cs^{137}$, gaseous fission products liberated from atomic reactions, etc.; other electron sources, such as the betatron, etc.; fast or slow neutrons or the mixed neutron and gamma radiation, such as is present in certain atomic reactors; X-rays; and other miscellaneous sources, such as protons, deuterons, $\alpha$-particles, fission fragments, such as are available from cyclotrons, etc.

Welding depends on total dose of irradiation employed rather than on the rate of dose. The actual dose required for the welding operation depends on the specific type of organopolysiloxane employed, the degree to which the gum has already been cured, etc. In practice, I have found that total doses of above $0.1 \times 10^6$ rep., for example, from $0.5 \times 10^6$ to $50 \times 10^6$ rep. or higher, preferably from $1 \times 10^6$ to $10 \times 10^6$ rep. are generally satisfactory. In welding previously cured sections to obtain strong welds, it is preferable that each section should not be cured with more than $10 \times 10^6$ rep. prior to welding. However, one section may be cured to a higher dose if the other section is uncured or only slightly cured.

In order that those skilled in the art may better understand how the present invention may be practiced, the following examples are given by way of illustration and not by way of limitation.

The apparatus employed was that described in FIG. 1 with 800 kvp. electrons (kpv. refers to the peak voltage in kilovolts generated by the inductance coil with high voltage apparatus 1 during the conducting half cycle, and thus is the measure of energy of electrons emerging from window 7). All parts are by weight.

EXAMPLE 1

A methylpolysiloxane gum was prepared by heating octamethyltetrasiloxane with 0.01% KOH for about 6 hours. This gum had a viscosity of about $1 \times 10^6$ centipoises. This product is referred to as "gum."

The organopolysiloxane prepared in Example 1 was used in the following examples. Separate sections of material (referred to as material 1 and material 2, having the description disclosed in the tables for each example) were welded at room temperature with a dose stated for each table. The parts of filler used are based on parts of filler to 100 parts of organopolysiloxane. Each sample was then pulled until broken to determine the strength of the weld. The designation of strong weld in the table indicates that the sample broke outside of the weld. The results are presented in Tables I and II. In these tables C.B. is finely divided carbon black (SAF black, Phillips Pet. Co.) and S is silica (Santocel-C, Monsanto Chemical Co.).

Table I

[Welding Dose $4 \times 10^6$ rep.]

| Ex. | Material 1 | | Material 2 | | Remarks |
|---|---|---|---|---|---|
| | Parts Filler | Prior Cure | Parts Filler | Prior Cure | |
| 2 | none | none | none | none | strong weld. |
| 3 | do | do | 40 C.B. | do | Do. |
| 4 | do | do | 40 S | do | Do. |
| 5 | do | do | none | $0.5 \times 10^6$ | Do. |
| 6 | do | do | 40 C.B. | $0.5 \times 10^6$ | Do. |
| 7 | do | do | 40 S | $0.5 \times 10^6$ | Do. |
| 8 | 40 C.B. | do | 40 C.B. | none | Do. |
| 9 | 40 S | do | 40 S | do | Do. |
| 10 | 40 C.B. | do | 40 S | do | Do. |
| 11 | 40 C.B. | do | 40 C.B. | $0.5 \times 10^6$ | Do. |
| 12 | 40 S | do | 40 S | $0.5 \times 10^6$ | Do. |
| 13 | 40 C.B. | do | 40 S | $0.5 \times 10^6$ | Do. |
| 14 | 40 C.B. | $0.5 \times 10^6$ | 40 C.B. | $0.5 \times 10^6$ | Do. |
| 15 | 40 S | $0.5 \times 10^6$ | 40 S | $0.5 \times 10^6$ | Do. |
| 16 | 40 C.B. | $0.5 \times 10^6$ | 40 S | $0.5 \times 10^6$ | Do. |
| 17 | 40 S | $0.5 \times 10^6$ | 40 C.B. | $2 \times 10^6$ | Do. |
| 18 | 40 S | $0.5 \times 10^6$ | 40 S | $2 \times 10^6$ | Do. |
| 19 | 40 C.B. | $0.5 \times 10^6$ | 40 S | $2 \times 10^6$ | Do. |
| 20 | 40 S | $0.5 \times 10^6$ | 40 C.B. | $2 \times 10^6$ | Do. |
| 21 | 40 C.B. | $2 \times 10^6$ | 40 C.B. | $2 \times 10^6$ | Do. |
| 22 | 40 S | $2 \times 10^6$ | 40 S | $2 \times 10^6$ | Do. |
| 23 | 40 C.B. | $2 \times 10^6$ | 40 S | $2 \times 10^6$ | Do. |
| 24 | 40 C.B. | $4 \times 10^6$ | 40 C.B. | $4 \times 10^6$ | Do. |
| 25 | 40 S | $4 \times 10^6$ | 40 S | $4 \times 10^6$ | Do. |
| 26 | 40 C.B. | $4 \times 10^6$ | 40 S | $4 \times 10^6$ | Do. |

Table II

[Welding Dose $8 \times 10^6$ rep.]

| Ex. | Material 1 | | Material 2 | | Remarks |
|---|---|---|---|---|---|
| | Parts Filler | Prior Cure | Parts Filler | Prior Cure | |
| 27 | 40 C.B. | none | 40 C.B. | $4 \times 10^6$ | strong weld. |
| 28 | 40 S | do | 40 S | $4 \times 10^6$ | Do. |
| 29 | 40 C.B. | do | 40 S | $4 \times 10^6$ | Do. |
| 30 | 40 S | do | 40 C.B. | $4 \times 10^6$ | Do. |
| 31 | 40 C.B. | $.5 \times 10^6$ | 40 C.B. | $4 \times 10^6$ | Do. |
| 32 | 40 S | $.5 \times 10^6$ | 40 S | $4 \times 10^6$ | Do. |
| 33 | 40 C.B. | $.5 \times 10^6$ | 40 S | $4 \times 10^6$ | Do. |
| 34 | 40 S | $.5 \times 10^6$ | 40 C.B. | $4 \times 10^6$ | Do. |
| 35 | 40 C.B. | none | 40 C.B. | $10 \times 10^6$ | Do. |
| 36 | 40 S | do | 40 S | $10 \times 10^6$ | Do. |
| 37 | 40 C.B. | do | 40 S | $10 \times 10^6$ | Do. |
| 38 | 40 S | do | 40 C.B. | $10 \times 10^6$ | Do. |
| 39 | 40 C.B. | $4 \times 10^6$ | 40 S | $10 \times 10^6$ | Do. |
| 40 | 40 S | $4 \times 10^6$ | 40 S | $10 \times 10^6$ | Do. |
| 41 | 40 S | $4 \times 10^6$ | 40 C.B. | $10 \times 10^6$ | Do. |

EXAMPLE 42

Flanged silicone tubes for vascular grafts of the type illustrated in FIG. 3 were prepared by the following technique:

The organopolysiloxane prepared in Example 1 (100 parts) was filled with 40 parts of carbon black and rolled into a thin sheet. A nylon mesh (nylon 66) was placed between two of these thin sheets and pressed together to form one unitary piece with a nylon mesh core. Since this composition was very difficult to handle because of its stickiness, it was irradiated to a partial cure with about $0.5 \times 10^6$ rep. The cured product was considerably easier to handle. Since vascular grafts are used on critical parts of the body, such as in the aorta, handling is very important since stickiness in working can cause small defects which could be fatal. This partially cured, filled organopolysiloxane was rolled into a tube 12. Small washer-shaped sections having a hole of the same diameter as tube 12 were cut from the partially cured composite sheet and placed in intimate contact with both open ends of tube 12 to form the flanges of the finished graft 13. This flanged tube having the shape shown in FIG. 3 was exposed to $4 \times 10^6$ rep. to produce a strong composite unit which was used in a vascular graft in the aorta of a dog which survived for more than one year thereafter. The flange not only facilitated suturing of the silicone tube to the vascular organ but also performed a more important function of making it possible to form a smoother uninterrupted joint between aorta and prosthesis. That is, all of the suturing was done in the flange so that none of the suture material protruded in the inside of the aorta. In the absence of a smooth uninterrupted joint a turbulent flow will exist which can result in clotting. Another advantage of using irradiated silicones in such vascular grafts is that they contain less impurities than found in peroxide cured silicones.

The unexpectedness of this invention is illustrated by the fact that other polymers capable of being cured by high energy ionizing radiation cannot be welded by this process. Attempt to weld together other polymers was unsuccessful. In these examples two thin sections having a thickness of about 5 mils were placed upon each other and irradiated at room temperature with $10 \times 10^6$ rep. The polymers used and the results obtained are disclosed in Table III.

*Table III*

Polymer-polymer combinations that do not bond together with doses of $10 \times 10^6$ rep.:

| Example: | | |
|---|---|---|
| 43 | Nylon to Nylon | No weld. |
| 44 | Polyethylene to Polyethylene | Do. |
| 45 | Nylon to Polyethylene | Do. |
| 46 | Mylar to Mylar | Do. |

Nylon used in the above examples was nylon 66; polyethylene, Alathon I, Du Pont de Nemours & Co.; Mylar (the polymer formed from reacting terephthalic acid with ethylene glycol), was sold by Du Pont de Nemours & Company.

Although this invention has ben illustrated with methylpolysiloxanes and carbon black and silica fillers, other organopolysiloxanes and fillers such as those disclosed in the specification can also be employed. In addition, organopolysiloxanes partially to moderately cured with chemical curing agents such as peroxides can be joined together by this invention where the presence of such curing agents in the final product does not interfere with the intended use.

Since silicones are resistant to corona attack, the process of my invention can be applied to the insulation of electrical conductors. One method of preparing such insulated conductors comprises of (1) partially curing an organopolysiloxane tape, (2) wrapping the tape around the conductor to be insulated, and (3) treating this wrapped insulator with high energy radiation until the individual sections of tape are welded to form an integral silicone insulation. Since the tape is only partially cured, it readily conforms to the irregular contours of the conductor, thus producing a coating which is substantially moisture-proof and free of air voids. Welding with radiation seals the tape together to form a continuous integral coating which prevents moisture attack on the underlying insulation. The process can be carried out so that the conductor is wrapped and irradiated continuously. The partially cured silicone tape could be either backed with such material as paper, cloth, resin or unbacked depending on the desired mechanical strength and degree of stretch. The backing could also be of silicone containing one type of filler while the inside contains another. The tape can also contain fibers such as reinforcing strands or mesh of various natural or synthetic materials such as nylon, Orlon, Dacron, glass cloth, natural fibers such as cotton, silk, wool, etc., to give it added tear and handling strength, etc. One method of preparing such tapes containing the reinforcing mesh is by sandwiching the mesh between two silicone layers and pressing them together. Strands of fiber can be milled into the silicone or can be sandwiched and pressed as a mat. These products can be stretched without breaking even when torn at the edges. By choosing the proper electron voltage one can obtain a tapered cure throughout the thickness of a single layer, for example, the backing part of the layer could have a $4 \times 10^6$ rep. cure with the dose diminishing or tapering to zero cure or else a partial cure at the opposite side.

EXAMPLE 47

A mixture of 100 parts of the organopolysiloxane (Ex. 1) with 40 parts of finely divided silica (Santocel-C) is compounded, and a tape prepared from this mixture is irradiated with $0.5 \times 10^6$ rep. This partially irradiated tape is wrapped around a copper conductor and irradiated to a dose of $10 \times 10^6$ rep. to produce an excellent integral insulating coating on the conductor which coating conforms to the irregularities of the conductor and is substantially free of moisture and air voids and thus has enhanced resistance to corona.

The products produced by the process of this invention are useful in any application for which cured silicones are now being used, for example, in preparing tubing, electrical insulation, articles of manufacture of various shapes, in sealing packages of silicone, etc. Because of their excellent high and low temperature properties, the product produced by the process of this invention can be used in those applications where natural or other synthetic rubbers fail due to the deleterious effect of heat and low temperature. Because they are relatively free of impurities they can be used for vascular grafts, etc.

What I claim as new and desire to secure by Letters Patent of the United States is:

1. A process of welding into an integral piece distinct and separate sections of organopolysiloxane which process comprises placing separate sections of organopolysiloxane in intimate contact with each other, and treating such contacted sections with high energy, ionizing radiation until welding is effected.

2. The process of claim 1 wherein all sections of organopolysiloxane contain a solid, inert filler.

3. The process of claim 1 where both sections of organopolysiloxane contain a reinforcing fiber mesh.

4. A tear resistant product comprising a composite of (1) at least two sections of an organopolysiloxane having (2) a reinforcing fiber mesh interposed between at least two sections of (1) said composite having been welded together into a unitary mass by the process of claim 1.

5. The process of claim 1 wherein some sections of organopolysiloxanes contain a solid, inert filler and the remainder of the sections do not contain a filler.

6. The process of claim 1 where the organopolysiloxanes are cured prior to welding.

7. The process of claim 1 in which prior to welding one section of organopolysiloxanes is cured and the other is not cured.

8. A process of preparing an insulated electrical conductor which comprises wrapping an electrical conductor with an organopolysiloxane which has been partially cured with high energy, ionizing radiation and subsequently completing the cure by treating the wrapped conductor with additional high energy, ionizing radiation.

9. The product comprising an electrical conductor wrapped with an organopolysiloxane tape, said tape having been welded into a unitary, insulating mass on said conductor after the wrapping operation by the method of claim 1.

10. The process as in claim 1 wherein the total irradiation dose to which the organopolysiloxane sections have been exposed is in the range of $5 \times 10^5$ to $5 \times 10^7$ rep.

11. The process as in claim 10 wherein electrons are the source of high energy, ionizing radiation.

12. The process as in claim 11 wherein the electrons have an energy in the range of $5 \times 10^4$ to $2 \times 10^7$ electron volts.

13. The product as in claim 4 wherein the organopolysiloxane sections have been exposed to a total radiation dose in the range of $5 \times 10^5$ to $5 \times 10^7$ rep.

14. The product as in claim 13 wherein electrons are the source of high energy, ionizing radiation.

15. The product as in claim 14 wherein the electrons have an energy in the range of $5\times10^4$ to $2\times10^7$ electron volts.

16. The process as in claim 8 wherein the radiation dose used to partially cure the organopolysiloxane is in the range of $5\times10^5$ to $1\times10^7$ rep. and the total radiation dose to which the organopolysiloxane is exposed, does not exceed $5\times10^7$ rep.

17. The process as in claim 16 wherein electrons are the source of high energy, ionizing radiation.

18. The process as in claim 17 wherein the electrons have an energy in the range of $5\times10^4$ to $2\times10^7$ electron volts.

19. The product as in claim 9 wherein the tape prior to winding on the conductor is irradiated with a radiation dose in the range of $5\times10^5$ to $1\times10^7$ rep. and the total radiation dose to which the organopolysiloxane is exposed, does not exceed $5\times10^7$ rep.

20. The product as in claim 19 wherein electrons are the source of high energy, ionizing radiation.

21. The product as in claim 20 wherein the electrons have an energy in the range of $5\times10^4$ to $2\times10^7$ electron volts.

References Cited in the file of this patent

UNITED STATES PATENTS

| | | |
|---|---|---|
| 2,643,964 | Smith-Johannsen | June 30, 1953 |
| 2,668,133 | Brophy et al. | Feb. 2, 1954 |
| 2,695,853 | Foreit | Nov. 30, 1954 |
| 2,703,775 | Panagrossi et al. | Mar. 8, 1955 |
| 2,715,363 | Hoover | Aug. 16, 1955 |
| 2,721,821 | Hoover | Oct. 25, 1955 |
| 2,763,609 | Lewis et al. | Sept. 18, 1956 |
| 2,766,220 | Kantor | Oct. 9, 1956 |
| 2,789,155 | Marshall et al. | Apr. 16, 1957 |